United States Patent
Guerrero

(10) Patent No.: US 9,684,189 B2
(45) Date of Patent: Jun. 20, 2017

(54) ADORNMENT ASSEMBLY FOR A WEARABLE ITEM

(71) Applicant: Rosaline M. Guerrero, Gilbert, AZ (US)

(72) Inventor: Rosaline M. Guerrero, Gilbert, AZ (US)

( * ) Notice: Subject to any disclaimer, the term of this patent is extended or adjusted under 35 U.S.C. 154(b) by 0 days.

(21) Appl. No.: 15/182,890

(22) Filed: Jun. 15, 2016

(65) Prior Publication Data

US 2016/0363786 A1 Dec. 15, 2016

Related U.S. Application Data

(60) Provisional application No. 62/230,763, filed on Jun. 15, 2015.

(51) Int. Cl.
| | |
|---|---|
| *G02C 11/02* | (2006.01) |
| *A44C 5/00* | (2006.01) |
| *A44B 1/30* | (2006.01) |
| *A44C 1/00* | (2006.01) |
| *A44C 17/02* | (2006.01) |

(52) U.S. Cl.
CPC ............. *G02C 11/02* (2013.01); *A44B 1/30* (2013.01); *A44C 1/00* (2013.01); *A44C 5/00* (2013.01); *A44C 17/0233* (2013.01)

(58) Field of Classification Search
CPC ..................................................... G02C 11/02
USPC ............................................. 351/51, 52, 158
See application file for complete search history.

(56) References Cited

U.S. PATENT DOCUMENTS

| | | | |
|---|---|---|---|
| 4,968,128 A | 11/1990 | Mendola | |
| 5,110,198 A | 5/1992 | Travis | |
| 5,654,787 A | 8/1997 | Barison | |
| D425,544 S | 5/2000 | Erpillo | |
| 6,120,146 A | 9/2000 | Harris | |
| 6,520,635 B1 | 2/2003 | Ignatowski | |
| 6,863,394 B1 | 3/2005 | Nelson | |
| 7,591,554 B2 | 9/2009 | Guerrero | |
| 8,549,879 B2 | 10/2013 | Mellinger et al. | |
| 8,857,979 B1 * | 10/2014 | Rothman | G02C 11/02 351/51 |
| 8,919,354 B2 | 12/2014 | Davis | |
| D738,426 S | 9/2015 | Frith | |
| D741,399 S | 10/2015 | Ho | |
| D753,214 S | 4/2016 | Ho | |
| 2009/0273754 A1 | 11/2009 | Ridgeway | |
| 2014/0313033 A1 | 10/2014 | Ariely | |

\* cited by examiner

*Primary Examiner* — Hung Dang
(74) *Attorney, Agent, or Firm* — Mark V. Loen

(57) ABSTRACT

The embodied invention is a design that provides components for attaching adornment articles to eyewear and adornment holders. The design ensures that only the adornment article will be visible and maintain proper orientation. Additionally, the adornment article is held securely in place yet is easily removable and interchangeable with a variety of other adornment articles.

5 Claims, 5 Drawing Sheets

ADORNMENT ASSEMBLY FOR A WEARABLE ITEM

CROSS REFERENCE TO RELATED APPLICATIONS

This application claims the benefit of U.S. provisional patent application No. 62/230,763 filed on Jun. 15, 2015. The entire provisional application is included by reference herein.

STATEMENT REGARDING FEDERALLY SPONSORED RESEARCH OR DEVELOPMENT

Not applicable.

REFERENCE TO SEQUENCE LISTING, A TABLE, OR COMPUTER PROGRAM LISTING

Not applicable.

BACKGROUND OF THE INVENTION

The invention relates to an adornment equipment designed to provide adornment articles to be prominently mounted on eyeglass frames and holders commonly used for jewelry display.

DESCRIPTION OF RELATED ART

Others have attempted to incorporate adornment features in eyewear design using various methods. For example, U.S. Pat. No. 6,520,635 utilizes a quick-release spring-based clamp to attach jewelry to temples of eyewear. While this attaching method is useful for hanging adornments, the attachment feature does not provide suitable rigidity to maintain proper orientation for the small ornamental designs that are favored for eyewear. Additionally, the clamping spring is visibly exposed when clamping a small adornment item, rendering it unsuitable and undesirable for the wearer.

U.S. Pat. No. 5,654,787 utilizes a retainer to grip the eyewear frame with an attached strap. The overall design is unsatisfactory for an adornment design as it will not maintain proper orientation due to motion of the attaching strap. The strap does not have enough flexibility to accommodate all of the potential temple designs to rigidly maintain adornment orientation. Also, the attaching equipment is large when compared to the size of smaller adornments and it is exposed to view making it unsuitable and undesirable to a wearer.

It is desirable to provide for orientation of any adornment article. For example, if the adornment article is words or a logo, the adornment article must be oriented in a preferred orientation so it is readable. If the adornment article attaching method does not secure the orientation, it is frustrating for a wearer. Instead of being pleasing, it is embarrassing to wear such a mis-oriented adornment article.

It is desirable in the art to miniaturize the means of attaching eyewear adornment articles so that only the adornment article is visible. It is important from an aesthetic that only the adornment article is visible, and importantly, the adornment article maintains proper orientation. Further, it is important that the adornment article does not slide horizontally on eyewear frame in normal use. Finally, it is important that the adornment article is easily and quickly removed, so as to facilitate interchangeability with other adornment articles according to the desires of the wearer.

BRIEF SUMMARY OF THE INVENTION

The embodied invention is a design that provides components for attaching adornment articles to eyewear and adornment holders. The design ensures that only the adornment article will be visible and maintain proper orientation. Additionally, the adornment article is held securely in place yet is easily removable and interchangeable with a variety of other adornment articles.

BRIEF DESCRIPTION OF THE SEVERAL VIEWS OF THE DRAWING(S)

DETAILED DESCRIPTION OF THE INVENTION

The principal objective of the embodied invention is to provide interchangeable adornment articles for use with a wearable item that will allow a user to easily change their adornment article. Additionally, the design provides for easy and simple preparation of the wearable item and provides for easy interchange between similarly prepared wearable items. Wearable items include bracelets, necklaces, and rings. Another objective is to provide for adding adornment articles that do not impede vision or motion, and remain in a stationary position and orientation during any user motion. Finally, another objective is to make a compact and transparent attaching design that is not viewable after the adornment article is attached to the wearable item.

The embodied invention provides for a wide variety of different adornment articles to be mounted on wearable items, such as eyewear frames and jewelry holders, by utilizing a mounting method that provides for the objectives just described. Adornment articles include a large variety of 2D or 3D items such as geometrical shapes, items that are seen in nature such as animals and insects, cartoon characters, plants, sports related items, entertainment items, logos, consumer goods, words, patriotic items, tourist items, and the like as may be desirable for a user to wear.

Figure 1A:
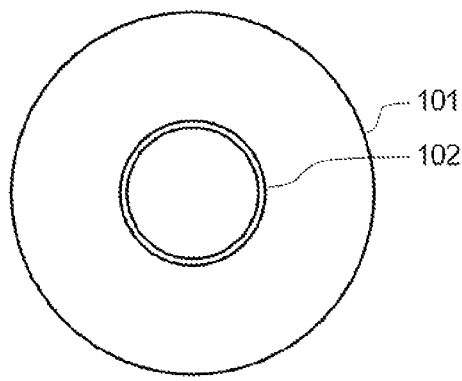
FIGS. 1A-1D shows an adornment insert.
Figure 1B:
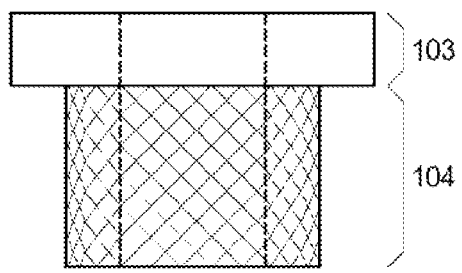
Figure 1C:
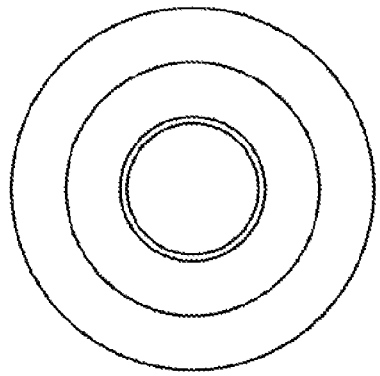
Figure 1D:
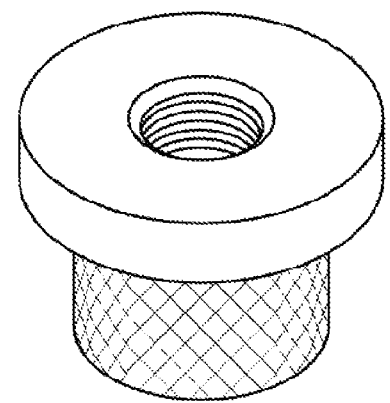

FIG. 1A is a top plan view of the adornment insert, FIG. 1B is a side elevational view, FIG. 1C is a bottom view, and FIG. 1D is a perspective view.

FIGS. 1A-1D show an adornment insert 101 with a threaded through hole 102 along the lengthwise dimension of the adornment insert, an insert rim 103, and an insert cylindrical base 104. The adornment insert is designed to be incorporated at a prominent position on a wearable item, displaying the adornment article on personal items such as eyewear and jewelry. When the adornment insert is added to an eyewear frame, the adornment insert becomes a permanent part of the eyewear frame.

In a preferred embodiment, the adornment insert has a lengthwise central 2-3.5 mm diameter threaded through hole that is 2-3.5 mm in length. The insert rim is 4-5 mm in diameter and is 0.5-1 mm thick. The cylindrical base is 3-3.5 mm in diameter, and 1.5-2.5 mm long. The insert rim and cylindrical base are machined together as one piece. The dimensions are important for creating a compact and secure attachment to the wearable item, and additionally, minimize the possibility of viewing the insert when the adornment article is worn, particularly for when small adornment articles are worn.

The outside curved surface of the insert cylindrical base is machined in a gripping pattern, such as a cross hatch, so as to provide a rigid connection to the eyewear frame without the use of a glue. An insert hole in the eyewear frame is created to a dimension substantially the same as the outside diameter of the insert cylindrical base. The adornment insert is then pressed into the insert hole, and held in place by the machined gripping pattern. The machined gripping pattern on the outside of the insert cylindrical base additionally prevents the adornment insert from rotating when the adornment article is added by screwing it into the adornment insert.

Figure 2A:
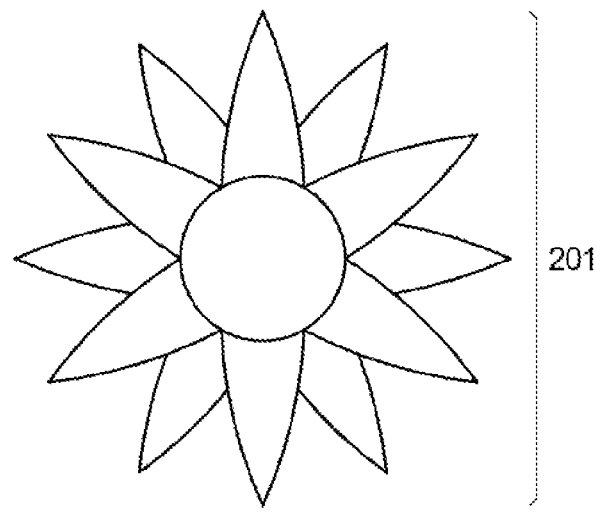
FIGS. 2A-2C shows how an adornment article is adapted to utilize the adornment insert.
Figure 2B:
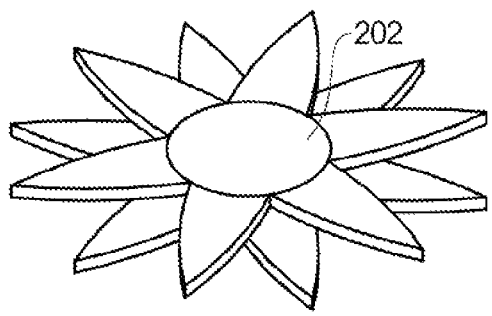
Figure 2C:
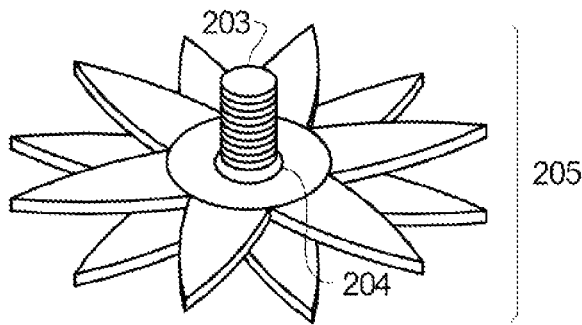

FIGS. 2A-2C show an adornment article 201 and a non-viewing back side 202 of the adornment article so situated to receive a threaded shaft 203 that is designed to be attached to the adornment article by solder, brazing, or glue 204. The threaded shaft, when attached to the adornment article as shown in FIG. 2C, makes an adornment sub assembly 205.

In a preferred embodiment, the threaded shaft has a 2 to 3 mm threaded diameter, and is 2 to 3 mm long. Additionally, the recessed cavity 202 is preferably not used, and the threaded shaft is centrally attached to the back side of the adornment article.

The threaded shaft is preferably close to perpendicular relative to the back side plane of the adornment article, as reasonably obtainable in a manufacturing setting. When the adornment assembly is threaded into the eyewear or wristlet, a non-perpendicular shaft will cause problems when rotating and orienting the adornment article. If the threaded shaft is too far from perpendicular, the edges of the adornment article will lock against the eyewear or wristlet and prevent it from being oriented properly.

Figure 3A:
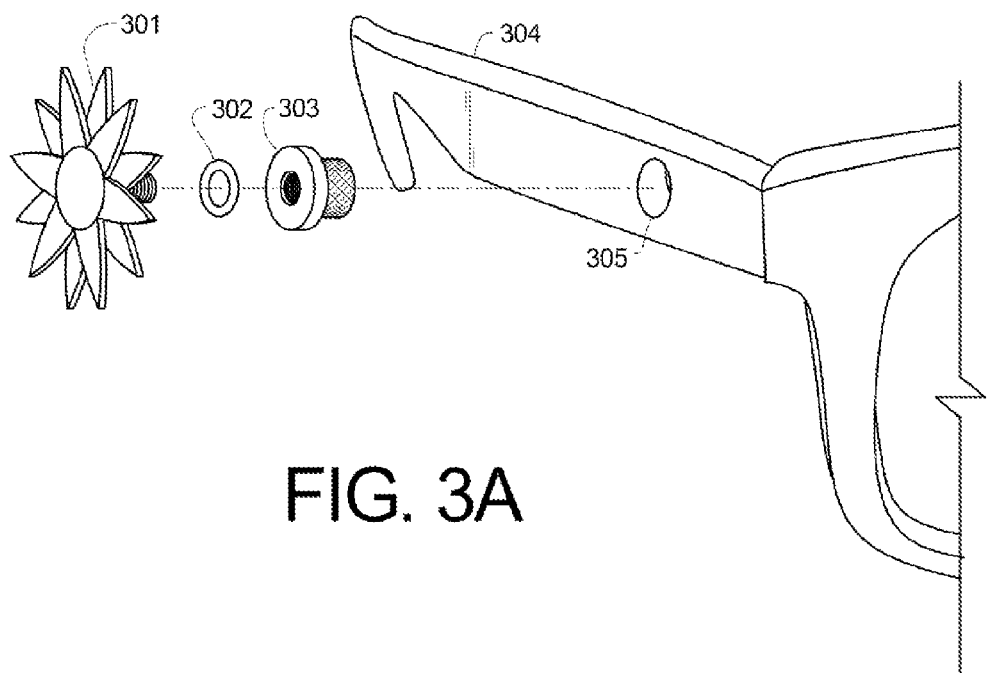
FIG. 3A is an exploded view of the adornment assembly for a wearable item such as eyewear.

FIG. 3A is an exploded view showing the adornment sub assembly 301, O ring 302, adornment insert 303, eyewear stem 304, and an insert hole 305. To add the adornment article to the eyewear stem, the adornment insert is pressed into the insert hole, the O ring is placed around the threaded shaft on the back of the adornment article, and then the adornment article is screwed into the adornment insert. Typically, an adornment article will be symmetrically added to both stems on a pair of glasses, but this is not a requirement.

The O ring is an important part of the adornment article assembly. The O ring provides for orienting the adornment article in a correct position without the need to register the threaded shaft and the adornment insert. The O ring is compressible, and provides enough spring action so that threading resistance is created. This resistance allows the adornment article to be correctly and reliably positioned on the eyewear frame.

Figure 3B:
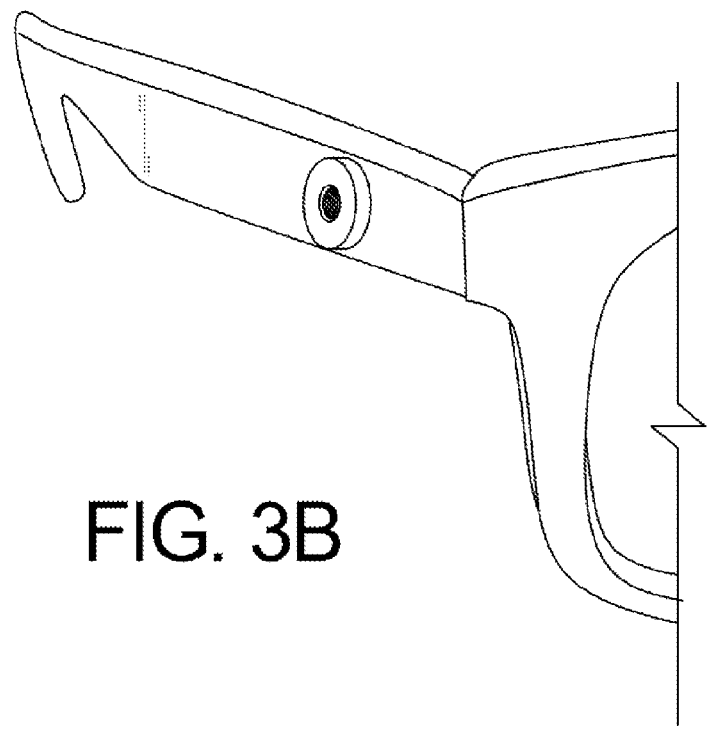
FIG. 3B shows the addition of an adornment insert into eyewear.
Figure 3C:
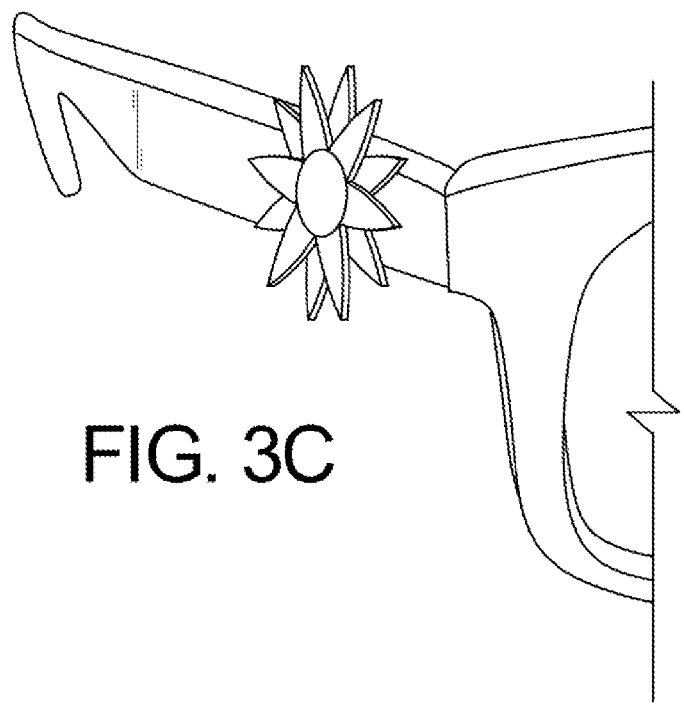
FIG. 3C shows an adornment article attached to an eyewear stem.

FIG. 3B shows the adornment insert after being pressed into the eyewear frame. FIG. 3C shows the adornment article when attached to an eyewear stem.

Figure 4A:
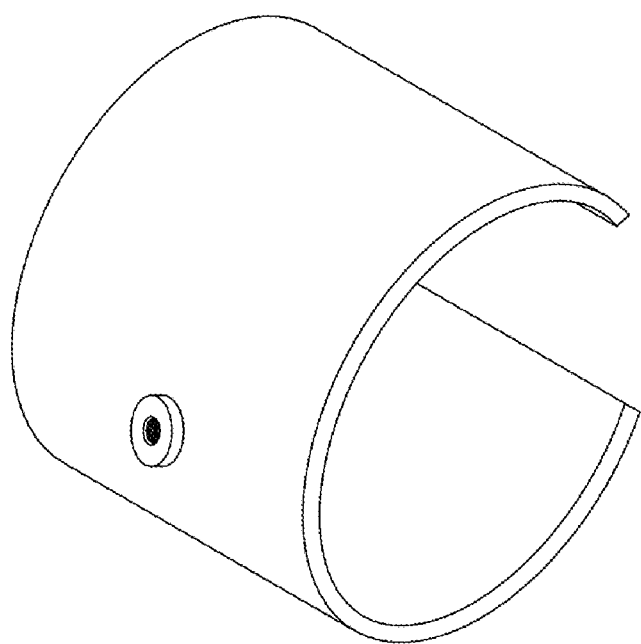
FIG. 4A shows the addition of an adornment insert into a wristlet.
Figure 4B:
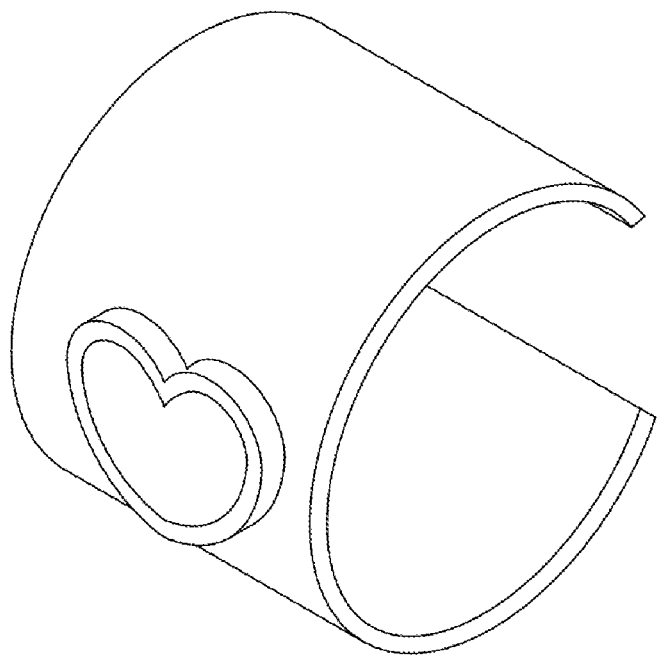
FIG. 4B shows the prominent display of the adornment article on the wristlet.

FIG. 4A shows the addition of an adornment insert into a wristlet after it has been pressed into the wristlet. FIG. 4B shows the adornment article on the wristlet.

It should be noted that the finished eyewear frame and wristlet of FIGS. 3C and 4B show the adornment article having proper orientation and stability, and is substantially free of viewing the O ring and the adornment insert.

It is readily understandable that the adornment articles can be quickly be removed by screwing/unscrewing and interchanged with other adornment articles. Also, it is readily understandable that the embodied invention described is adaptable to many wearable items which allow the addition of an adornment insert.

While various embodiments of the embodied invention have been described, the invention may be modified and adapted to various operational methods to those skilled in the art. Therefore, this invention is not limited to the description and figure shown herein, and includes all such embodiments, changes, and modifications that are encompassed by the scope of the claims.

I claim:

1. An adornment assembly for adornment article display on a wearable article comprising:
   A) an adornment insert comprising:
      1) an insert rim with a thickness and a diameter,
      2) an insert cylindrical base with a lengthwise dimension, a diameter, and an outside radial curved surface,
      3) wherein said outside radial curved surface is machined in a gripping pattern, and
      4) a threaded through hole centrally located in the lengthwise dimension of said adornment insert,
   B) an adornment sub assembly comprising:
      1) a threaded shaft with an outside diameter,
      2) an adornment article with a back side,
      3) wherein said threaded shaft is centrally attached to said back side and oriented substantially perpendicular to said back side, and
      4) wherein said threaded shaft is attached to said back side by use of solder or brazing,
   C) an O ring situated around said outside diameter of said threaded shaft,
   D) an insert hole created inside said wearable article, wherein said insert hole is substantially the same diameter of said insert cylindrical base,
   E) wherein said insert cylindrical base is located inside said insert hole, and
   G) wherein said threaded shaft is located inside said threaded through hole,
   whereby said adornment article is displayed on said wearable article.

2. The adornment assembly according to claim 1 wherein said threaded shaft has a threaded diameter between 2 and 3 mm, and is between 2 and 3 mm long.

3. The adornment assembly according to claim 2 wherein said adornment insert is between 2.5 and 3.5 mm in length and has a lengthwise central threaded through hole dimension between 2 and 3.5 mm.

4. The adornment assembly according to claim 3 wherein said insert cylindrical base is between 3 and 3.5 mm in diameter and has a lengthwise dimension of between 1.5 and 2.5 mm.

5. The adornment assembly according to claim 4 wherein said thickness of said insert rim is between 0.5 and 1 mm and said diameter of said insert rim is between 4 and 5 mm.

* * * * *